Aug. 11, 1959  W. P. EWALD  2,898,807
SLIDE CHANGING MECHANISM
Filed Sept. 13, 1955  2 Sheets-Sheet 1
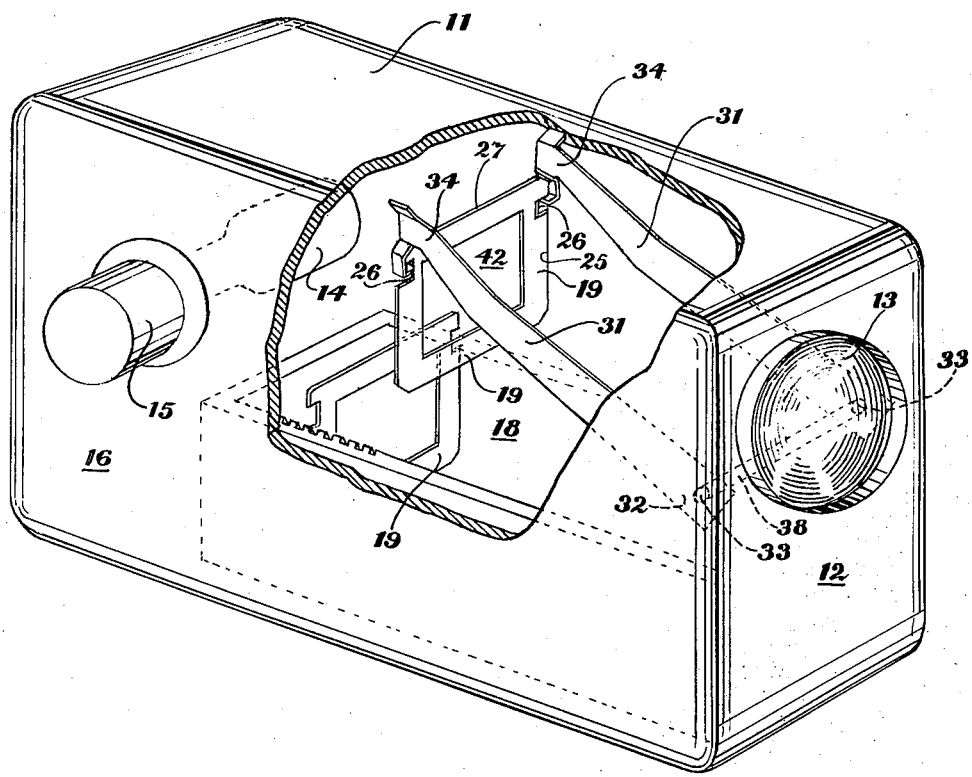
William P. Ewald
INVENTOR.

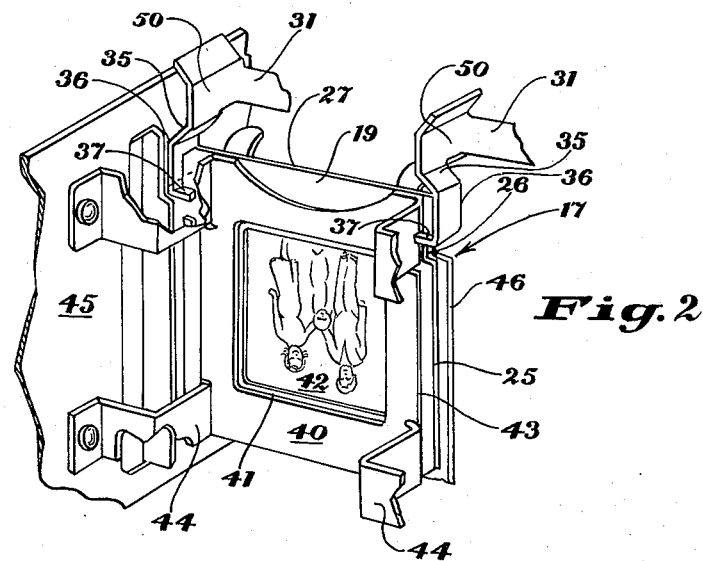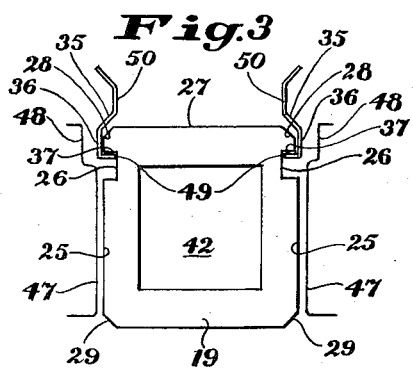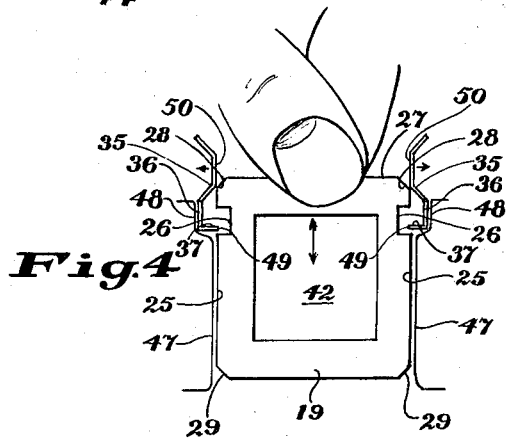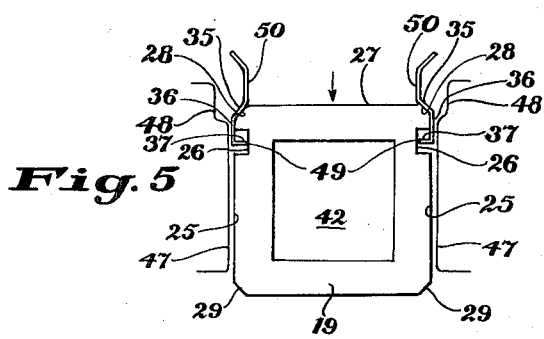

2,898,807

SLIDE CHANGING MECHANISM

William P. Ewald, Rochester, N.Y., assignor to Eastman Kodak Company, Rochester, N.Y., a corporation of New Jersey Application September 13, 1955, Serial No. 534,013

11 Claims. (Cl. 88—28)

The present invention relates to photography, and more particularly to a mechanism for moving transparency slides into and out of the gate of a slide projector, which mechanism is designed to permit changing of the slides while in position in the gate.

As is well known, a transparency or slide is moved into position for projection in the gate of a slide projector. After projection the slide is removed from the gate. The present invention provides an arrangement in which a slide is removed from a magazine and shifted into position in the gate. After the slide has been projected, it is returned to its original position in the magazine. The moving means may be manual or power actuated. In addition, the present invention provides an arrangement by which the moving means is held in direct and positive engagement with the slide during its movement to and from the gate to insure a positive moving action. However, when the slide is once positioned in the gate, the holding means for the moving means is rendered inoperative so as to permit the manual removal and/or replacement of the slide in the gate independent of the moving means.

The present invention has as its principal object the provision of a new and improved mechanism for moving slides into and out of a projection gate.

Still another object of the invention is the provision of an arrangement for insuring operative engagement of the moving means with the slide during such movement to provide a positive moving action of the slide to and from the gate.

And still another object of the invention is the provision of means to shift the moving means out of engaging relation with the slide while the latter is in the gate to permit the manual removal or replacement of a slide in the gate.

Yet another object of the invention is the provision of such arrangements which are simple, rugged, and highly effective in use.

To these and other ends the invention resides in certain improvements and combinations of parts, all as will be hereinafter more fully described, the novel features being pointed out in the claims at the end of the specification.

In the drawings:

Fig. 1 is a perspective view of a projector housing, with a portion broken away, showing the relation thereto of the slide shifting means of the present invention. For the purpose of clarity, certain parts of the projector have been omitted;

Fig. 2 is a perspective front view of the slide gate showing the relation of the gate parts and the slide shifting fingers;

Fig. 3 is a front view of the gate with the slide in position therein, showing the relation of the slide engaging and moving fingers, and the finger holding or retaining parts;

Fig. 4 is a view similar to Figure 3, but showing the lateral flexing of the fingers to disconnect the fingers from the slide to permit manual removal of the slide from the gate; and Fig. 5 is a view similar to Figs. 3 and 4 but showing the means for holding the fingers in position in the slide notches during the movement of the slide into and out of the gate to insure a positive moving action of the slides.

Similar reference numerals throughout the various views indicate the same parts.

The mechanism of the present invention is used, in the present instance, in a slide projector which comprises by way of illustration, a housing or container 11 the front wall 12 of which has mounted thereon a projection lens 13. A lamp 14 is positioned within the housing 11 and in optical alignment with the lens 13, and is carried by a socket 15 mounted in a side wall 16 of the housing 11. The lamp socket 15 may be connected to any suitable source of electrical energy, not shown. A slide gate, generally indicated by the numeral 17, Fig. 2, is positioned in the housing 11 between and in optical alignment with the lamp 14 and lens 13. For the purpose of clarity, the gate has been omitted in Fig. 1. Suitable condenser lenses, not shown, are also provided between the lamp and the gate and between the gate and the projector lens 13. The housing 11 has positioned in the bottom thereof a slide magazine 18, from which slides 19 may be removed selectively and lifted into position in the gate 17. After projection, the slide is returned to its position in the magazine. The mechanisms so far described are for illustrative purposes only and show one form of the projector with which the mechanism of the present invention may be used. Other suitable or well known projecting mechanisms can be used, so the showing of this particular type projector is not intended as a limitation.

The opposite side edges 25 of each slide 19 have formed thereon notches 26 positioned adjacent the top edge 27 of the slide, as shown in the drawings. The upper and lower corners of each slide 19 are cut away to form inclined edges 28 and 29 respectively, the purpose of which structure will be later more fully described.

In order to lift the slides individually from the magazine 18 and into position in the gate 17, and then to return the slides to the magazine after projection, a slide changing mechanism is provided. In the present embodiment, this mechanism comprises a pair of laterally spaced, flexible or resilient arms 31 the right ends 32 of which, Fig. 1, are secured at 33 to a rockable shaft or rod 38 so that by rocking the latter, either manually or by power, the left or free ends 34 of the arms may be raised or lowered, as is deemed apparent from an inspection of Fig. 1. The free ends 34 of the arms 31 are the shape best shown in Figs. 2 to 5 to form inclined or cam surfaces 35 and offset sections 36 the lower ends of which terminate in the form of inturned fingers 37, which extend into the notches 26 of the slides 19, as shown in Figs. 2–5.

It will be apparent from an inspection of Fig. 1, that if the arms 31 are rocked clockwise by shaft 38, the free ends 34 with their fingers 37 will be lifted upward to lift the slide 19 from the magazine 18 and to position the slide in gate 17. On the other hand, a counterclockwise rotation of the arms 31 by shaft 38 will lower the left ends 34 and fingers 37 to return the slide in proper position in the magazine 18.

The gate 17, in general, comprises a front plate 40 having an aperture 41 which frames the image area 42 of the slide. The front plate 40 has the side edges 43 thereof adjacent the top and bottoms thereof connected by Z-shaped brackets 44 to the side walls 16 and 45 of housing 11. A rear apertured plate 46, only a portion of which is shown in Fig. 2, cooperates with the plate 40 to hold the slide 19 substantially in a plane during projection, as is well known. When a slide has been moved by the fingers 37 to projecting position, the slide is positioned between plates 40 and 46, as shown in Fig. 2. It is some times found that for various reasons a slide may stick or bind and will not be positioned properly in the gate. In order to overcome this possibility, the present invention provides an arrangement for maintaining the fingers 37 in the notches 26 to provide a positive moving action for moving the slides to and from the gate.

Referring to Figs. 2-5, it is seen that the opposite sides of the gate are provided with supporting rails 47 which are spaced, for most of their vertical length, a distance only slightly more than the width of the slide itself. Now, as the arms 31 and fingers 37 are raised or lowered, the offset portions 36 of the fingers will either directly engage or come so close to the rails 47 as to prevent the lateral spreading of the arms 31 or fingers 37 and will thus prevent the fingers 37 from being withdrawn from notches 26, as shown in Fig. 5. With the parts positioned as shown in this figure, it is apparent that any vertical movement of the arms 31 and fingers 37 will impart a positive force to the slide to move the latter as a unit with the fingers, the advantages of which are deemed apparent. Thus, the slides are positively moved to and from the film gate.

It is some times found that during the editing of the slides, or at some later time, it is desirable to remove a particular slide or replace it. It is desirable to make such removal or replacement at the time the slide is in the projecting position, so that the image of the slide is visible on the screen, not shown. When the slide is in projecting relation in the gate, it is in the position shown in Fig. 3. In order to permit such slide removal and/or replacement, obviously it is necessary to move or flex the arms 31 laterally to shift the fingers 37 out of the notches 26. In order to permit such flexing of the arms 31 and movement of fingers 37, the upper ends of the rails 47 are offset outwardly as shown at 48, this offset being spaced a greater distance than the main portion of the rail 47. These offsets are in registry with the fingers 37 and notches 26 when the slide is in projecting position in the gate, as shown in Fig. 3.

Referring now to Figs. 3 and 4, it is apparent that if the slide is grasped as shown in Fig. 4, and moved upward, the upper inclined corners 28 of the slide will engage the inclined or cam surfaces 35 of arms 31 and will shift the latter and the fingers 37 laterally to the position shown in Fig. 4, in which position the portion 36 of the arms engage the offset 48 of the rails 47. Also, in this position, the fingers 37 have been withdrawn completely from the notches 26, and the inner ends of the fingers are now spaced a distance slightly greater than that between the edges 25 of the slide 19. In other words, the fingers are now spaced apart a distance greater than the width of the slide, and the latter may be removed from the gate merely by pulling or lifting the slide upward, as indicated in Fig. 4. After the slide has been removed, the fingers 37 will again move inwardly due to the resilient nature of the arms 31.

Now, if it is desirable to replace the removed slide with another selected slide, the latter is moved downward between the gate members 40 and 46 and between the arms 31, which are still in the position shown in Fig. 3. During such downward movement, the inclined lower corners 29 of the slide 19 will first engage the vertical sections or surfaces 50 of the arms, just above the inclined surfaces 35 to move the arms laterally apart to spread the arms 31 and fingers 37 further apart. The surfaces 50 are spaced a distance slightly less than the spacing of the inner edges of the fingers 37. The slide 19 is then moved downward until the notches 26 are finally brought into registry with the fingers 37, whereupon the latter, due to the resiliency of the arms 31, moves inwardly or towards each other, and into the notches 26. The parts are then in the position shown in Fig. 3. Thus, by means of this simple arrangement, slides can be removed from and replaced in the gate independent of the rocking movement of the arms 31, as is deemed apparent from an inspection of Figs. 3-5, and from the above description.

The present invention thus provides a slide changing mechanism which prevents the slide lifting fingers from spreading during slide movement, so as to retain the fingers in positive engagement with the slides to provide a positive moving force or actuation to shift the slides to and from the projection gate. However, when the slide is once in projecting position, the fingers may be readily and easily spread apart merely by moving the slide so as to permit the latter to be removed from the gate. A new slide may then be inserted in the gate, and during such insertion the fingers are automatically spread apart to permit the insertion of a new slide in the gate and when the new slide has been properly positioned, the moving fingers automatically move inward to engage in the notches of the slot. The parts are simple in design, few in number, rugged, and highly effective in use.

While one embodiment of the invention has been disclosed, it is to be understood that the inventive idea may be carried out in a number of ways. This invention is, therefore, not to be limited to the precise details described but is intended to cover all variations and modifications falling within the scope of the appended claims.

What I claim and desired to secure by Letters Patent of the United States is:

1. A slide changing mechanism for use with slides each of which has a notch on each side edge thereof, the combination with a projection gate, laterally flexible movable means engaging in said notches to move said slides into and out of said gate, of means on said slides contacting said engaging means to shift the latter laterally out of said notches to permit slides to be moved manually into and out of said gate.

2. A slide changing mechanism for use with slides each of which has a notch on each side edge thereof, the combination with a projection gate, laterally movable means engaging in said notches to move said slides into and out of said gate, of cam means on said slides movable into engagement with said engaging means to shift the latter laterally out of said notches to free said slides to enable the latter to be removed from and inserted in said gate independent of said engaging means.

3. A slide changing mechanism for use with slides each of which has a notch on each side edge thereof, the combination with a projection gate, means engaging in said notches to move said slides into and out of said gate and to support the slides in depending relation in said gate, of cooperating cam surfaces on said slides and said engaging means rendered operative upon movement of a slide in said gate independent of said engaging means to move said engaging means out of said notches to permit a slide to be removed from or positioned in said gate independently of said engaging means.

4. A slide changing mechanism for use with slides each of which is provided with aligned notches on the opposite edges thereof, the combination with a housing, a projection gate positioned in said housing, of a pair of laterally spaced laterally flexible arms pivoted at one end in said housing, fingers formed on the other ends of said arms and engaging in said notches so that movement of said arms about said pivot will move a slide into and out of said gate, and cam means on each slide movable into engagement with said fingers when a slide is moved in said gate independent of said fingers to flex said arms laterally to shift said fingers out of said notches to permit manual removal and replacement of a slide in said gate.

5. A slide changing mechanism for use with slides each of which is provided with aligned notches on the opposite edges thereof, the combination with a housing, a projection gate positioned in said housing, of a pair of laterally spaced flexible arms pivoted at one end in said housing, fingers formed on the other ends of said arms and engaging in said notches so that movement of said arms about said pivot will move a slide into and out of said gate, an inclined surface on each of said fingers, inclined upper corners on each slide engageable with said surfaces when a slide is moved upwardly manually in said gate to shift said arms laterally to move said fingers out of said notches to free said slide to permit manual removal of the slide from said gate, and inclined lower corners on each slide to move the arms and fingers laterally to permit a slide to be inserted manually in said gate, said fingers registering with and moving into said notches when a slide is positioned in said gate.

6. A slide changing mechanism for use with slides each of which is provided with aligned notches on the opposite edges thereof, the combination with a housing, a projection gate positioned in said housing, of a pair of laterally spaced flexible arms pivoted at one end in said housing, inwardly bent fingers on the free ends of said arms extending into said notches so that movement of said arms about said pivot will cause said fingers to move a slide into and out of said gate, an inclined surface on each arm adjacent and above the finger thereof, upper inclined corners on said slide movable into engagement with said surface when a slide is moved upwardly manually in said gate independent of said fingers to shift said fingers out of said notches to permit removal of a slide from said gate independent of said arms and fingers, and lower inclined corners on each slide movable into engagement with said fingers when a slide is inserted manually into said gate to flex said arms laterally to spread said fingers, the latter sliding along the side edges of said slide as the latter is inserted into said gate but when the slide is finally positioned in said gate the fingers register with and move inwardly into said notches.

7. A slide changing mechanism for use with slides each of which has a notch on each side edge thereof, the combination with a projection gate, movable means engaging in said notches to move said slides into and out of said gate, of means positioned in the path of said engaging means to retain the latter positively in said notches during the movement of a slide into and out of said gate, said retaining means being inoperative when a slide is positioned in said gate, and cooperating means on a slide and said engaging means to shift the latter out of said notches to permit manual removal of a slide from said gate.

8. A slide changing mechanism for use with slides each of which has a notch on each side edge thereof, the combination with a projection gate, movable means engaging in said notches to move said slides into and out of said gate, of a pair of laterally spaced flexible pivoted arms, fingers on the free ends of said arms engaging in said notches so that rocking of said arms about said pivots moves a slide into and out of said gate, and blocking members positioned adjacent said gate and in the path of said fingers to retain the latter in said notches to insure positive movement of said slides into and out of said gate.

9. A slide changing mechanism for use with slides each of which has a notch on each side edge thereof, the combination with a projection gate, movable means engaging in said notches to move said slides into and out of said gate, of a pair of laterally spaced flexible pivoted arms, fingers on the free ends of said arms engaging in said notches so that rocking of said arms about said pivot moves a slide into and out of said gate, blocking members positioned adjacent said gate and in the path of said fingers to retain the latter in said notches to insure positive movement of said slides into and out of said gate, said blocking means having recess portions with which said fingers register when the slide is positioned in said gate, and means to move said fingers into said recesses and out of said notches to permit removal of a slide from said gate independent of said arms and fingers.

10. A slide changing mechanism for use with slides each of which has a notch on each side edge thereof, the combination with a projection gate, movable means engaging in said notches to move said slides into and out of said gate, of a pair of laterally spaced flexible pivoted arms, fingers on the free ends of said arms engaging in said notches so that rocking of said arms about said pivots moves a slide into and out of said gate, blocking members positioned adjacent said gate and in the path of said fingers to retain the latter in said notches to insure positive movement of said slides into and out of said gate, said blocking means having recess portions with which said fingers register when the slide is positioned in said gate, and cooperating means on a slide and said arms for shifting said arms laterally to move said fingers out of said notches to permit manual removal or insertion of a slide in said gate independently of said arms and fingers.

11. A slide changing mechanism for use with slides each of which has a notch on each side edge thereof, the combination with a projection gate, of a pair of laterally spaced flexible pivoted arms, fingers on the free ends of said arms engaging in said notches so that rocking of said arms about said pivot moves a slide into and out of said gate, blocking members positioned adjacent said gate and in the path of said fingers to retain the latter in said notches to insure positive movement of said slides into and out of said gate, said blocking means having recess portions with said fingers register when the slide is positioned in said gate, inclined surfaces on said arms above said fingers, inclined upper corners on said slide movable into engagement with said surfaces upon upward manual movement of a slide in said gate to flex said arms laterally to move said fingers into said recesses and out of said notches to disconnect said arms and fingers from the slide to permit manual removal of the slide from said gate, and lower inclined corners on said slide movable into engagement with said fingers when a slide is inserted manually into said gate to flex said arms laterally to move said fingers into said recesses, said fingers sliding along the side edges of the slide as the latter is being inserted into said gate but when the slide is positioned in said gate said notches are moved into registry with said fingers and the arms flex inwardly to move said fingers into said notches to support the slide in position in said gate.

References Cited in the file of this patent

UNITED STATES PATENTS

| 544,493 | Wigle | Aug. 13, 1895 |
| 643,894 | Furdek | Feb. 20, 1900 |
| 650,076 | Gattung | May 22, 1900 |
| 835,369 | Skinner | Nov. 6, 1906 |
| 1,435,696 | Cartwright | Nov. 14, 1922 |
| 1,492,162 | Delens | Apr. 29, 1924 |
| 1,611,843 | Altena | Dec. 21, 1926 |
| 1,741,228 | Garlick | Dec. 31, 1929 |

FOREIGN PATENTS

| 281,447 | Great Britain | Dec. 8, 1927 |